C. G. TANQUARY & W. J. CALDWELL.
AUTOMOBILE PULLING DEVICE.
APPLICATION FILED AUG. 12, 1916. RENEWED APR. 25, 1918.
1,282,316.
Patented Oct. 22, 1918.
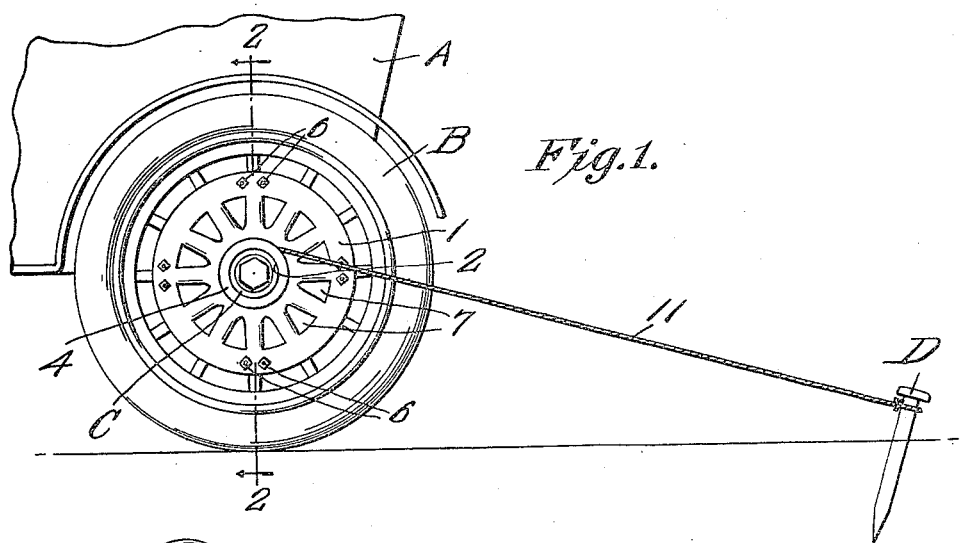
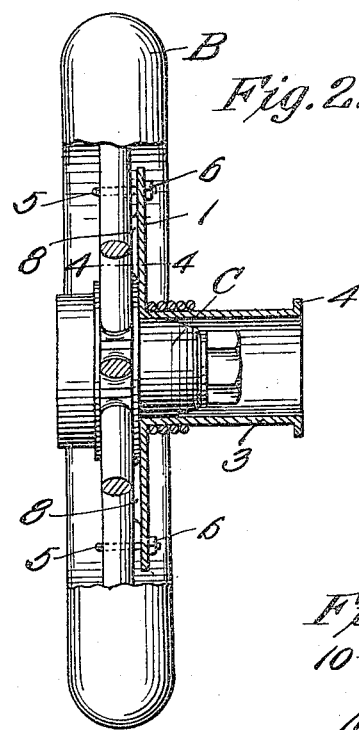
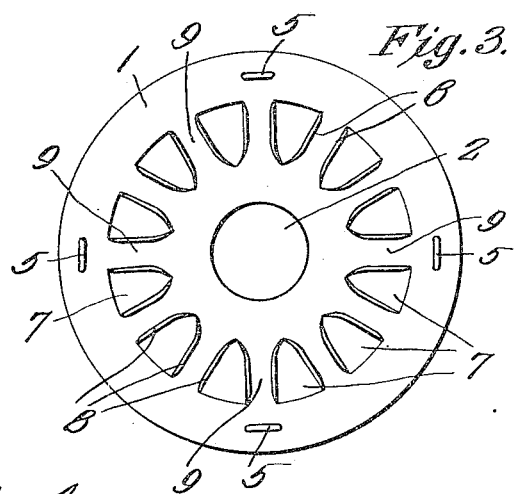
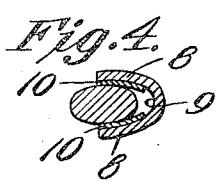
Witnesses
James F. Crown,
Wm. H. Mulligan
Inventors
Charles G. Tanquary &
William J. Caldwell,
Richard B. Owen
Attorney

UNITED STATES PATENT OFFICE.

CHARLES G. TANQUARY AND WILLIAM J. CALDWELL, OF HENRYETTA, OKLAHOMA.

AUTOMOBILE PULLING DEVICE.

1,282,316. Specification of Letters Patent. Patented Oct. 22, 1918.

Application filed August 12, 1916, Serial No. 114,590. Renewed April 25, 1918. Serial No. 230,846.

*To all whom it may concern:*

Be it known that we, CHARLES G. TANQUARY and WILLIAM J. CALDWELL, citizens of the United States, residing at Henryetta, in the county of Okmulgee and State of Oklahoma, have invented certain new and useful Improvements in Automobile Pulling Devices, of which the following is a specification.

This invention relates to an automobile pulling device and more particularly to an attachment for one of the wheels of an automobile whereby the vehicle may be made to pull itself from ruts in a road or from an embedded position in the soft surface of muddy roads.

The primary object is to provide a device of this character that may be quickly and easily attached to or detached from one of the wheels of an automobile and which will be provided with a winch for receiving a draft cable whereby the automobile may be withdrawn from a road or embedded position in a muddy road when the power is applied to the rear wheels.

A further object of this invention is the provision of an automobile pulling device which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of our invention, in which;

Figure 1 is a fragmentary side elevation of the rear portion of an automobile showing the device applied thereto.

Fig. 2 is a fragmentary section on the line 2—2 of Fig. 1.

Fig. 3 is an elevation of the inside face of the appliance.

Fig. 4 is a detail section on the line 4—4 of Fig. 2.

Referring to the drawing, wherein is illustrated the preferred form of our invention, and in which like numerals of reference indicate corresponding parts throughout the several views, the automobile, designated by the character A, is of the usual construction and is provided with the rear wheels B each having a hub C.

The attachment comprises a circular disk 1 having a central opening 2 and a hollow cylindrical drum 3 is integrally formed with the disk at the edge of the central opening 2. The drum 3 is adapted to fit snugly over the hub C of the wheel and extends laterally from the center of the wheel, as clearly shown by Fig. 2 of the drawing, and its extreme terminal is provided with an annular flange 4. A plurality of clamps 5 are provided and each clamp consists of a substantially U-shaped member adapted to fit around the spokes of the wheel and have its ends extended through openings provided in the disk 1 adjacent the periphery thereof and are provided with nuts 6 for fastening the disk and the clamps in tight engagement with the wheel spokes.

A plurality of circumferentially spaced cut-out portions or openings 7 are provided in the disk 1 and the material displaced by these openings is bent outwardly from the inside face of the disk and slightly curved to provide the flanges 8 adapted to embrace the spokes of the wheel. Each pair of flanges 8, thereby provides a channel 9 into which each spoke of the wheel is placed when the disk is in applied position. And, in addition to the clamping elements 5, the flanges diminish the amount of strain exerted on the disk and the rear wheel when the device is in operation. The clamps 5 are intended to merely hold the disk in place upon the wheel and are not intended to assume any of the strain which occurs when the device is in operation. The flanges 8 embrace the spokes in such a manner as to cause the flanges to assume all of the strain and, if so desired, the inside contacting surfaces of the flanges may be provided with a strip of felt 10 or other suitable material for preventing injury being done to the spokes of the wheel.

A cable 11 has one end secured to the drum 3 and, when the device is in operation, the opposite end of the cable will be secured to a stake D driven into the ground at any convenient point.

In operating the device it is merely necessary to start the motor of the automobile, thereby causing the rear wheels to rotate which will, in turn, rotate the drum 3 causing the cable 11 to wind thereon and exert a pull for removing the automobile from the rut in which it is embedded.

From the foregoing it will be observed that a very simple and durable automobile pulling device has been provided, the details of which embody the preferred form. We desire it to be understood however, that slight changes in the minor details of construction may be made without departing from the spirit of the invention or the scope of the claims hereunto appended.

We claim:

1. An automobile pulling device comprising, in combination, a drum mounted upon the automobile wheel hub, a circular disk at one end of said drum having a plurality of circumferentially spaced openings, said openings being formed by bending the material outward along the opposite edges thereof, thus producing integral flanges, the said flanges adapted to embrace the wheel spokes at each side thereof.

2. An automobile pulling device comprising, in combination, a drum mounted upon the automobile wheel hub, a circular disk at one end of said drum having a plurality of circumferentially spaced openings, said openings being formed by bending the material outward along the opposite edges thereof, thus producing integral flanges, the said flanges adapted to embrace the wheel spokes at each side thereof, and strips of soft material interposed between the flanges and the sides of the said spokes.

3. An automobile pulling device comprising, in combination, a drum mounted upon the automobile wheel hub, a disk carried by the drum and in close proximity to the spokes of the wheel, a plurality of flanges integrally formed with the disk and arranged in pairs, each pair of flanges embracing one of the spokes, a fastening element carried by the disk and connected to certain of the said spokes.

4. An automobile pulling device comprising, in combination, a drum mounted upon the automobile wheel hub, a disk carried by the drum and in close proximity to the spokes of the wheel, a plurality of flanges integrally formed with the disk and arranged in pairs, each pair of flanges embracing one of the spokes, a fastening element carried by the disk and connected to certain of the said spokes, the said flanges being formed by bending portions of the said disk to extend radially of the disk and between said spokes.

In testimony whereof we affix our signatures in presence of two witnesses.

CHARLES G. TANQUARY.
WILLIAM J. CALDWELL.

Witnesses:
NIDA BOAZ,
J. R. VAUGHAN.

Copies of this patent may be obtained for five cents each, by addressing the "Commissioner of Patents, Washington, D. C."